Nov. 6, 1934.  E. P. SAVIDGE  1,980,002
AIRCRAFT
Original Filed June 30, 1931  3 Sheets-Sheet 1

Inventor
Evan P. Savidge
By Lyon & Lyon
Attorneys

Nov. 6, 1934.    E. P. SAVIDGE    1,980,002
AIRCRAFT
Original Filed June 30, 1931    3 Sheets-Sheet 2
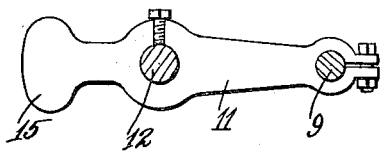
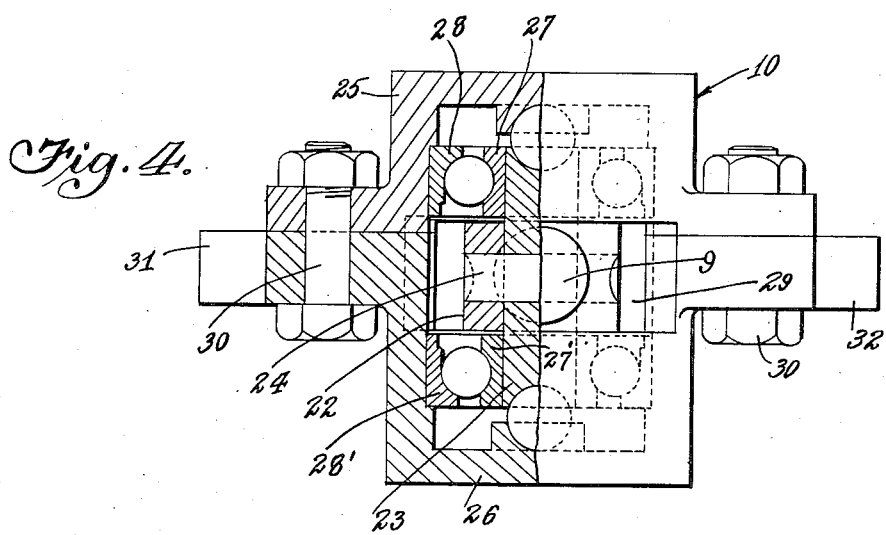
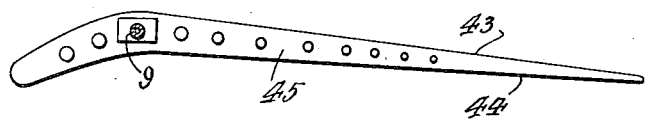
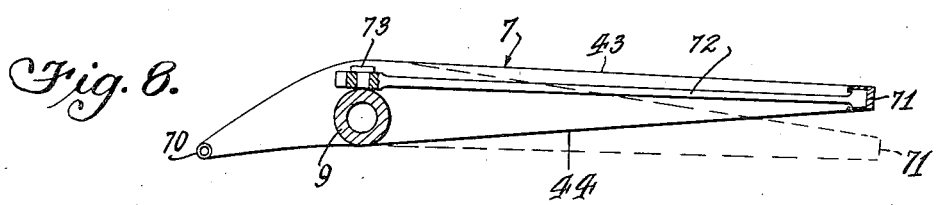
Inventor
Evan P. Savidge
By Lyon & Lyon
Attorneys Patented Nov. 6, 1934

1,980,002

UNITED STATES PATENT OFFICE 1,980,002

AIRCRAFT

Evan P. Savidge, Los Angeles, Calif.

Application June 30, 1931, Serial No. 547,829
Renewed April 2, 1934

3 Claims. (Cl. 244—13)

This invention relates to a new and novel aircraft construction and means for propelling and sustaining aircraft. In general, the invention relates to aircraft construction in which movable wings are employed, said wings moving along an arcuate path which may be either circular or elliptical.

It is acknowledged by those skilled in the art that aircraft depending entirely upon the air screw for propulsion are very inefficient. A great excess of power is required to obtain a relatively small amount of propulsion from a narrow propeller and an increase in the size of the propeller is impractical for various reasons. In order to obviate the difficulties and disadvantages of the air screw type of propulsion, attempts have been made to employ movable wings, the proposed constructions and modes of operation having as their object a duplication of the movable wings of birds.

The construction of a bird's wing involves complex compound motions which are practically impossible to duplicate in a machine constructed of ordinary materials. Furthermore, the resulting device is so extremely delicate that the operator must have an extraordinary sensitive sense of equilibrium and balance and be sufficiently rapid in his reflex actions to become, to all intents and purposes, an integral part of the machine which he is operating. Furthermore, the previous attempts to employ movable wings as a source of ship propulsion merely contemplated a vertical reciprocating movement of the wing and such reciprocating movement necessarily gives rise to vibration and sets up numerous strains on wings of the size required when this mode of propulsion is employed.

This invention, on the other hand, employs movable wings as a means of propulsion of aircraft but said wings do not describe a linear reciprocating motion but instead describe an arcuate path, thereby eliminating a great many of the difficulties encountered heretofore with reciprocating wings. Furthermore, it has been discovered that when wings movable along an arcuate path are used, their size may be greatly reduced with respect to the size of the wings required when said wings describe a linear reciprocating motion.

In general, it may be stated that this invention relates to aircraft modeled after the mode of propulsion employed by insects. It is well known, for example, that insects such as dragon flies, houseflies, and the like, can travel at enormous speeds by moving their wings along an arcuate path, said path generally assuming the form of a figure 8, the small circle or ellipse of the eight being described by what may be called the trailing edge of the wing whereas the large circle of the eight is described by the forward or incident edge of the wing.

It is an object of this invention to disclose and provide an aircraft construction by means of which aircraft may be propelled by employing wings moving along an arcuate path, said path describing either a circle, an ellipse, a figure 8, or some other continuous curve of similar character.

Another object of this invention is to disclose and provide an improved construction for aircraft whereby continuous rotary motion may be translated into an oscillating motion of wings carried by the aircraft.

Another object is to disclose and provide an improved aircraft construction in which movable wings are employed, said wings exerting a lifting and a propulsion force at substantially every point in their cycle of motion, duration between lifting and propulsion force varying, however, during the cycle of motion.

Another object is to disclose and provide an aircraft in which movable wings are employed, said wings being partially rotatable on wing members pivotally connected to the body of the aircraft, said wing members moving along an arcuate path.

Another object is to disclose and provide an improved form of aircraft in which stationary planes are employed and in which propulsion is attained by means of wings pivotally connected to the body, said wings moving along an arcuate path.

Another object is to disclose and provide an improved form of aircraft in which movable wings of great flexibility are employed.

A still further object is to disclose and provide means whereby wings pivotally connected to the body of an aircraft may be actuated so as to give rise to lifting and pushing forces, at substantially every instant during flight.

A still further object is to disclose and provide means for controlling the motion of aircraft in the air, such aircraft being driven by means of movable wings.

An object of this invention is to disclose and provide an improved form of aircraft which may be propelled through the air in a much more efficient and economical manner than has been obtained hereto, by means of movable wings pivotally connected to the body of the aircraft, said wings moving along arcuate paths.

These and other objects, uses and advantages of this invention will become apparent to those skilled in the art from the following detailed description of the invention and one preferred form in which it may be embodied.

In describing the invention, reference will be had to the appended drawings, in which Fig. 1 is a perspective view of one form of aircraft embodying this invention.

Fig. 3 is an enlarged vertical section taken along the plane 3—3 indicated in Fig. 2.

Fig. 4 is an enlarged elevation partly in section of one form of universal joint housing which may be employed.

Fig. 5 is a transverse section taken through one of the movable wing members, said section being taken along the plane 5—5 indicated in Fig. 2.

Fig. 8 is a view taken along the plane 8—8 of Fig. 2.

In general, this invention concerns itself with the discovery that a very effective form of aerial propulsion is obtained by employing power driven wings, such wings moving in an arcuate path. Preferably such movable wings are pivotally connected to the body portion or fuselage of the aircraft, the wings being pivotally carried on wing members extending from such fuselage or body portion so that during the arcuate movement of such wings, they are permitted to partially rotate on the wing members.

Figure 1:
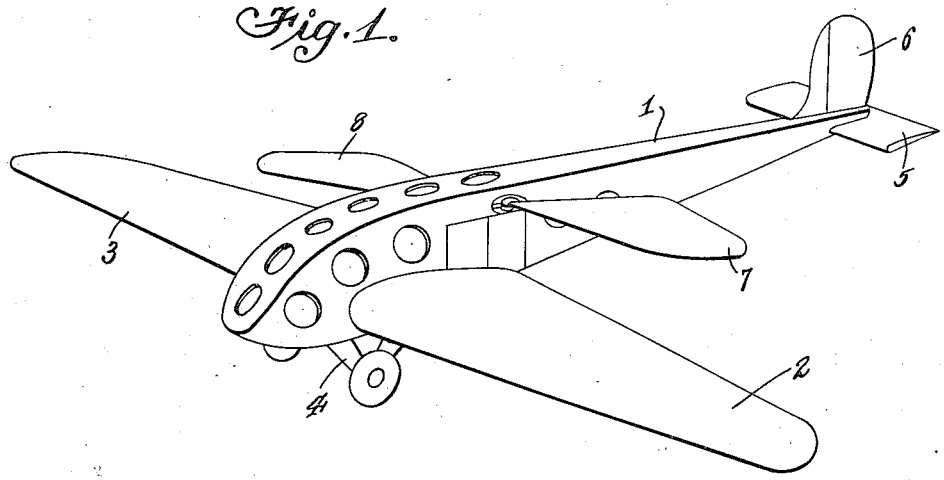

As shown in Fig. 1 which illustrates merely one form of aircraft employing the motive power means embraced by this invention, the aircraft may consist of a body portion 1 provided with suitable stationary planes 2 and 3. Such aircraft may be provided with any desirable form of landing gear 4 and with elevators 5 and a rudder 6 in accordance with good aircraft design. The motive power is provided, however, by means of one or more pairs of movable wings such as the opposing movable wings 7 and 8.

As shown in Fig. 1, the movable wings 7 and 8 may be pivotally connected to the body portion 1 at a point in back of the stationary planes 2 and 3 and slightly above the plane of such stationary planes 2 and 3.

Figure 2:
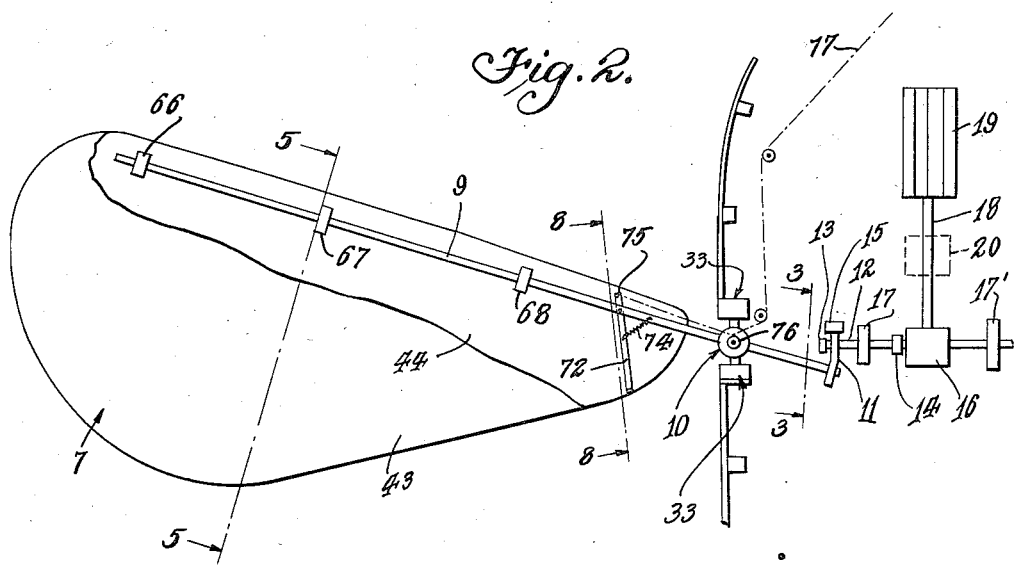
Fig. 2 is a plan view of one-half of an aircraft provided with movable wings, said view being partly diagrammatic in form.

As shown in Fig. 2, the wing 7 may be carried by a wing member 9 pivotally connected to the body portion 1 as by means of a universal joint 10 described in greater detail in Fig. 4. The inner extension of the wing member 9 may be rotatably connected to a crank arm 11 mounted upon a driven shaft 12 carried in suitable bearings 13 and 14. The crank arm 11 may be provided with a counterweight 15. The driven shaft 12 may lead to a differential 16 of desired construction and form, the driven shaft 12 also carrying a suitable braking device or brake drum 17. A drive shaft 18 may lead from a suitable source of power such as a motor 19 to the differential 16. If desired, a fluid or electromagnetic transmission 20 may be introduced in the drive shaft 18. Rotation of the drive shaft 18 will therefore cause the crank arm 11 to rotate, thereby imparting a rotation to the end of wing member 9. The end of the wing member 9 which is rotatably carried by the crank arm 11 may rotate within such crank arm 11 but the wing member 9 does not rotate along its own axis.

The universal joint 10, one form of which is shown in Fig. 4, is designed to permit the wing member 9 to be directed in substantially any direction and to move freely within a cone of about 45 degrees angle.

The wing member 9 may be connected to or be made a part of a collar 22 provided with a center aperture adapted to receive a pin 23 with its axis at right angles to the longitudinal axis of the wing member 9. Connection between the collar 22 and the vertical pin 23 may be made in any desired manner as, for example, by means of a locking pin 24. The vertical pin 23 may be provided with suitable bearings at its ends and may be carried in a split housing consisting of an upper member 25 and a lower member 26. Suitable bearing races may be carried within the upper and lower housing portions 25 and 26, such as, for example, the inner and outer bearing races 27 and 28 and 27' and 28', so as to permit the vertical pin 23 to rotate in said housing. Ports 29 may be formed in the housing portions so as to permit the wing member 9 to extend therethrough and move in a horizontal plane in such ports. The housing portions 25 and 26 may be held together in any suitable manner as by means of the bolts 30, trunnions 31 and 32 in alignment with each other and lying along an axis at right angles to the axis of the pin 23, being formed integral or suitably connected to such housing portions 25 and 26. In this form of construction it is necessary that the longitudinal axis of the wing member 9, the axis of the trunnions 31 and 32 and the axis of the vertical pin 23 have a common point of intersection. The trunnions 31 and 32 are mounted in suitable bearings by the fuselage or body portion and generally indicated at 33 in Fig. 2.

The wings, such as the wings 7, are carried by the wing members 9 in such manner as to prevent longitudinal motion of the wings along the wing members but to permit partial rotation of the wings about the wing members. Preferably the wings are flexible so as to give and bend from entering edge to trailing edge, with changes in air pressure or direction of movement of the wing as a whole. Flexible wings of small size can be readily made but for larger wings, it is necessary to permit partial rotation of the wing about its wing member.

In general, the configuration of the wings may vary with the purpose to which such wings are to be put. It is possible to follow the outlines of the wings of various insects. It has been found that a wing which is long and narrow is adapted to develop great speed but does not have as much lifting power as a wing which is a little shorter and wider. The wing for the major portion of its length is preferably curved in accordance with the rules of air-foils. If a transverse section be taken through the wing at a point of its greatest width, then the forward downwardly curving portion should be about one-seventh of the length of the rear substantially straight portion. The wing members are preferably connected to the wings at the point of their greatest thickness, namely, at a point where the forward or entering edge curves into and becomes a part of the main portion of the wing.

That portion of the wing adjoining the body of the aircraft is preferably made of flexible materials and not rigidly reinforced.

Means can be provided, however, for increasing or decreasing the rigidity of this portion of the wing, thereby changing its characteristics and permitting it to function as a lifting surface either to a greater or lesser degree.

Figure 9:
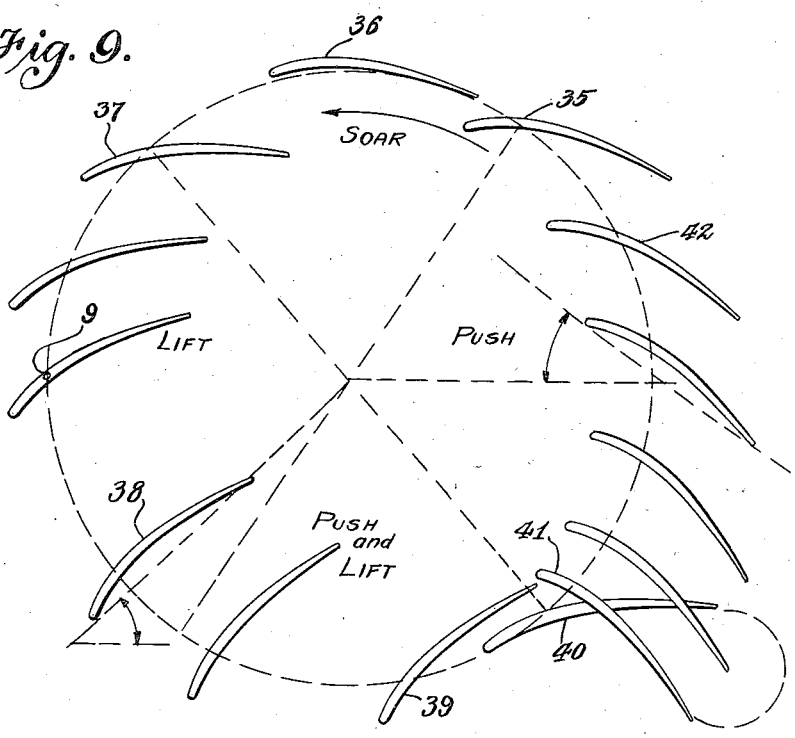
Fig. 9 is a diagrammatic representation of various positions assumed by a movable wing during its motion in flight.

Fig. 9 diagrammatically illustrates the position of an outer portion of a wing during a cycle of movement. If, for example, we assume that the wing rotates in the direction of the arrow and starts from a position indicated at 35, then during this movement from 35 to a position at about 37 no substantial forward push is exerted, the wing merely acting as in gliding, that is, supporting the aircraft but not driving it. As the wing moves from the position 37 to a position at about 38, it exerts considerable lift inasmuch as it moves downwardly against the air pressure. As a result, there is a tendency for the wing to pivot on its wing member 9 so that from a normal angle of incidence such as the wing had in position 36, it reaches a maximum inclination at position 38, the angle in position 38 being as much as 30 degrees. Such pivoting motion from position 37 to 38 is caused by the action of air pressure on the lower rear areas of the wing.

From position 38 to a position at about 39 the angularly of the wing is gradually decreased. During this motion from position 38 to position 39, the wings exert a considerable amount of lift with a certain proportion of push or forward resultant. As the wing moves from position 39 to position 40, its angularity with respect to the horizontal is still further decreased until a point is reached such as is indicated at 40 where a considerable amount of air pressure is exerted on the upper rear surfaces of the wing. When this occurs, the wing describes what may be termed a gasp or flutter, assuming a position such as is indicated at 41.

During the motion of the wing from a position indicated at 40 to a position indicated at about 42, the wing is inclined at an angle varying with its position in the cycle of movement. The inclination of the wing may reach 30 or 35 degrees in very flexible wings. During this portion of its travel, the wing exerts an appreciable forward push as it receives pressure on its upper surfaces.

Admittedly, if a wing were merely to be rotated or moved along an arcuate path while maintaining its position with respect to the horizontal always the same, then a wing moving in such manner would not exert any appreciable push or lift. The importance of using flexible wings or wings which are capable of partially rotating on their wing members, is therefore apparent.

As shown in Fig. 5, the main portion of the wing may be made of structural materials, such as, for example, ply wood, thin metallic sections, or the like. For example, the section taken at Fig. 5 represents an upper covering 43 and a lower covering 44, such coverings being spaced apart by a suitable shaped metallic section 45. The wing member 9 is pivotally and yieldably connected to the wing, as more clearly shown in Fig. 6.

The wing member 9 may be provided with flanges or fins 46 and 47 extending from opposite sides of the wing member 9. Compression springs 48 and 49 may be carried between the flanges 46 and 47 and the top plate 50 of a rectangular housing surrounding the wing member 9. The housing may consist of the upper plate 50, side plates 51 and 52 and a bottom plate 53. A vertical partition 54 may extend from the bottom plate 53. The inner surfaces of the side members 51 and 52 may be provided with dovetailed grooves 55 and 56. The opposite sides of the partition 54 may also be provided with dovetailed grooves 57 and 58. Supporting plates 60 and 61 may be movably positioned between the partition 54 and the side members 51 and 52. The member 60, for example, is provided with tongues extending into the dovetailed grooves 55 and 57 respectively whereas the member 61 is provided with tongues extending into the grooves 58 and 56 respectively. Externally threaded bolts 62 and 63 may be pivotally connected to the members 60 and 61 respectively, the bolts 62 and 63 being threaded into the bottom member 53, the heads of such bolts extending downwardly beyond the lower surface 44 of the wing. Compression springs 64 and 65 are positioned between the bearing members 60 and 61 and the flanges or fins 47 and 46. By turning the bolts 62 and 63, therefore, the compression of the springs 64 and 65 may be adjusted to any desired extent.

Figure 6:
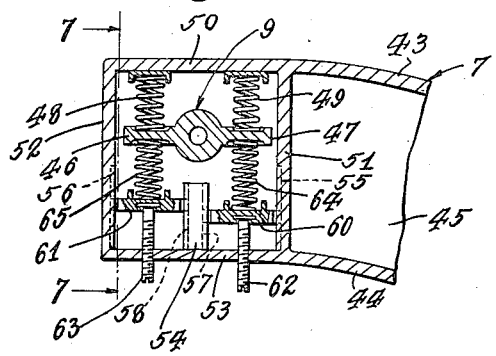
Fig. 6 is an enlarged view of a portion of Fig. 5 showing the yieldable mounting of the wing on its wing member.
Figure 7:
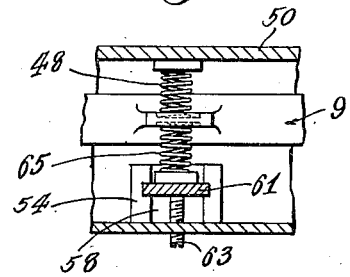
Fig. 7 is a view taken along the plane 7—7 indicated in Fig. 6.

A plurality of such yielding bearings as shown in Figs. 6 and 7 may be employed along the length of the wing member 9. Three of such spring balanced bearings are indicated in Fig. 2 at 66, 67 and 68.

Intermediate such yielding bearings the wing may carry fixed bearings through which the wing member 9 extends. It is to be understood that the flanges or fins 46 and 47 are provided only at points where the spring counter-balance is used, other portions of the wing member 9 being cylindrical in form.

A wing constructed as described hereinabove, will therefore assume a certain angle of incidence, such angle of incidence depending upon the relative compressive strengths of the springs 64 and 65. Such angle of incidence may be changed by adjusting the bolts 62 and 63. Furthermore, during actual flight the wing will partially rotate about the wing member 9, the springs 49 and 65, for example, being placed under compression when the forward edge of the wing tips whereas the springs 48 and 64 are placed under increased compression when the rear or trailing edge of the wing is depressed.

As has been stated hereinabove, that portion of the wing 7 adjoining the body of the aircraft, is preferably made more flexible than the wider and further portions of the wing. As shown in Fig. 8, the wing at such point may merely consist of the wing member 9, an entering edge member 70, and a channel-shaped trailing edge member 71, the only connection between the trailing edge member 71 and the entering edge member 70 being the covering materials 43 and 44. The member 71 will maintain its position relatively to the wing member 9 merely because of inherent elasticity and rigidity of the material from which the trailing edge member 71 is made.

During actual movement, the trailing edge 71 unless reinforced, would therefore bend very appreciably. Such bending may be prevented by means of an adjustable stiffening rib 72 pivotally connected to the wing member 9 as indicated at 73, the rear end of the stiffening member 72 being slidably mounted within the trailing edge member 71. The stiffening member 72 may be connected to the wing member 9 as by means of a tension spring 74 tending to maintain the stiffening member 72 in substantial alignment with the wing member 9. A cable 77, however, may be connected to the upper end of the stiffening member 72 as indicated at 75, such cable leading to a sheave 76 carried on the universal joint housing 10. The cable 77 may then pass over suitable pulleys to a control stick or lever located in the pilot's compartment, thereby permitting the pilot at will to cause the stiffening member 72 to assume a position such as is indicated in Fig. 2, thereby materially stiffening the wing at such point and in effect changing and in effect increasing the lifting characteristics of the wing. It will be understood that suitable spring take-up means may be installed in the cable 77 so that a uniform maximum tension is always maintained in such cable even during operation of the wings.

As shown in Fig. 8, when the stiffening arm 72 is in withdrawn position (substantially aligned with the wing member 9) the trailing edge 71 of the wing may assume the position indicated in dotted lines. When the stiffening member 72 has been extended, however, the wing will assume the position indicated in full lines in Fig. 8.

The operation and construction of the aircraft will be obvious to those skilled in the art from the description given hereinabove. Details of construction have not been given as only ordinary engineering skill in aircraft design is necessary in designing an aircraft adapted to fly in accordance with this invention. The selection of materials, relative sizes and proportions follow the rules of aeronautical engineering which are now well known.

It may be noted that the movable wings necessary to propel a two passenger aircraft need only be about four feet long. Such wings should be driven at a speed in excess of about five revolutions per second. A speed of about fifteen to twenty revolutions per second is sufficient. These general figures are being given merely for purposes of illustration, it being understood that wing speeds will vary with the design of the wing and with its size.

It will be apparent, therefore, that this invention relates to an aircraft in which a means of propulsion employing rotatable wings is employed in connection with gliding wings. This construction has numerous advantages over the ordinary rotating propeller, the movable wing eliminating the following disadvantages of the propeller: the propeller offers direct head resistance in proportion to its size and speed and creates in its wake a shield of compressed air which increases with the speed and when the propeller is positioned in front of the fuselage or wing, the shield of compressed air increases resistance and adds to the element of vibration; the propeller does not possess inherent lifting power and as soon as minimum speed is reached, the propeller propelled machine begins to fall whereas there is no minimum speed of the movable wing of this invention at which the wing does not exert some lifting power.

Aircraft propelled in accordance with this invention are capable of taking off the ground in a shorter period of time and at a steeper rising angle than propeller driven machines. Furthermore, aircraft constructed in accordance with this invention have a much higher cruising speed and greater lifting capacity, are capable of being readily maneuvered, are of superior stability and are capable of landing at steeper angles and at lower speeds than the majority of aircraft driven by means of propellers.

It is not necessary that opposed wings be driven in parallel synchronism. Turning is greatly facilitated by applying either the brake 17 or the brake 17' on the driven shaft 12, thereby slowing down the one or the other of the wings 7 and 8. Of course, the ailerons may be carried by the gliding wings to facilitate maneuvering.

Preferably the center of gravity of the entire aircraft of the type illustrated in Fig. 1 should be somewhere between the stationary planes and the point at which the movable wings are connected to the body, this particular point depending upon the relative lifting capacities of the stationary planes and the movable wings. In high speed machines it has been found desirable to use a fuselage with a low monoplane type of wing, the movable wings being positioned above the trailing edge of the gliding wings.

Although in the form of aircraft shown in Fig. 1 the wings 7 and 8 are positioned in the rear and slightly above the stationary planes 2 and 3, it is to be understood that the movable wings may be positioned in front of the stationary planes. Furthermore, such movable wings may be positioned below the plane of the stationary planes but a position below the plane of the stationary planes necessitates the use of a rather high landing gear. Furthermore, the invention is not limited to an aircraft provided with but one pair of opposing movable wings 7 and 8. Instead, a multiplicity of movable wings may be employed. All such changes and modifications as come within the scope of the appended claims are therefore embraced thereby.

I claim:

1. In an airship, the combination of a body portion, stationary planes extending from the body portion, wing members pivotally connected to said body portion at a point above the plane of said stationary planes, said wing members being adapted to describe an arcuate path in the air, and wings carried by said wing members, said wings being adapted to partially rotate through an angular displacement of not more than 90° during the motion of said wing members, and motor means carried by said body for actuating said wing members and wings.

2. In an airship, the combination of a body, a drive shaft in said body, a motor connected to said shaft by means of a differential, driven shafts extending from said differential, a brake carried by each of said driven shafts, an arm carried by each of said driven shafts, a wing member pivotally connected to said body and rotatably journaled to each of said arms whereby said wing members may be caused to describe an arcuate path, a flexible wing carried by each of said wing members, said wings being adapted to partially rotate through an angular displacement of not more than 90° during the motion of said wing members, said wings being provided with a flexible trailing portion, and means carried by the wing members for selectively stiffening said flexible portion of the wings.

3. In an airship, the combination of a body, stationary planes extending from the body, wing members pivotally connected to said body above the plane of said stationary planes and in the rear of said stationary planes, means carried by the body for driving said wing members to describe a conical circular motion in the air, and a wing carried by each of said wing members, said wings having a smaller surface area than the area of said stationary planes, said wings being adapted to partially rotate on said wing members through an angular displacement of not less than 30° nor more than 90°.

EVAN P. SAVIDGE.